(12) United States Patent
Markham et al.

(10) Patent No.: US 10,036,509 B2
(45) Date of Patent: Jul. 31, 2018

(54) NITROGEN BLANKETING SYSTEM

(71) Applicants: Steve Markham, Southlake, TX (US); Zane Miller, Southlake, TX (US); Terry Horton, Southlake, TX (US)

(72) Inventors: Steve Markham, Southlake, TX (US); Zane Miller, Southlake, TX (US); Terry Horton, Southlake, TX (US)

(73) Assignee: Natural Resources, L.L.C., Southlake, TX (US)

(*) Notice: Subject to any disclaimer, the term of this patent is extended or adjusted under 35 U.S.C. 154(b) by 76 days.

(21) Appl. No.: 15/211,884

(22) Filed: Jul. 15, 2016

(65) Prior Publication Data

US 2017/0030521 A1    Feb. 2, 2017

Related U.S. Application Data

(60) Provisional application No. 62/294,626, filed on Feb. 12, 2016, provisional application No. 62/294,607, (Continued)

(51) Int. Cl.
*F17C 3/12* (2006.01)
*F17C 3/00* (2006.01)
(Continued)

(52) U.S. Cl.
CPC ............ *F17C 3/12* (2013.01); *B01D 17/0202* (2013.01); *B67D 1/00* (2013.01); *F17C 3/005* (2013.01); *F17C 13/04* (2013.01); *G07F 13/02* (2013.01); *F17C 2201/0119* (2013.01); *F17C 2201/035* (2013.01); *F17C 2221/014* (2013.01); *F17C 2260/053* (2013.01); *F17C 2265/065* (2013.01)

(58) Field of Classification Search
CPC ....... B67D 1/00; B01D 17/0202; G07F 13/02; F17C 13/04; F17C 2201/035; F17C 2201/0119; F17C 2260/053; F17C 2265/065; F17C 2221/014
See application file for complete search history.

(56) References Cited

U.S. PATENT DOCUMENTS 2,870,936 A   1/1959   Clayton
2,983,405 A   5/1961   Tayler
(Continued)

FOREIGN PATENT DOCUMENTS

JP          0415499 A    5/1992

OTHER PUBLICATIONS

"Nitrogen Vending: The Only Inflation and Deflation Machine in the World" from website "http://nitrovend.com/" last accessed Jun. 16, 2016.
(Continued)

*Primary Examiner* — Ian Paquette
(74) *Attorney, Agent, or Firm* — James E. Walton

(57) ABSTRACT

A nitrogen blanket system for small fuel tanks is disclosed that includes tank empty-space pressure control for sealed tanks that can hold pressure. The system includes a fuel tank storing some volume of fuel, such as diesel fuel. The remaining empty volume is filled with nitrogen by the disclosed system. The nitrogen blankets the liquid fuel and fills the remaining space in the fuel tank to prevent the accumulation of moisture and thereby prevent corrosion within the fuel tank.

5 Claims, 3 Drawing Sheets

Related U.S. Application Data filed on Feb. 12, 2016, provisional application No. 62/198,015, filed on Jul. 28, 2015.

(51) Int. Cl.
*F17C 13/04* (2006.01)
*G07F 13/02* (2006.01)
*B01D 17/02* (2006.01)
*B67D 1/00* (2006.01)

(56) References Cited

U.S. PATENT DOCUMENTS

| | | | | |
|---|---|---|---|---|
| 3,081,239 | A * | 3/1963 | Clauss | B01F 13/0222 |
| | | | | 204/227 |
| 3,467,349 | A | 9/1969 | Gautier | |
| 4,378,920 | A | 4/1983 | Runnels | |
| 6,193,500 | B1 * | 2/2001 | Bradt | B67D 7/0476 |
| | | | | 141/59 |
| 6,843,269 | B2 | 1/2005 | Verma | |
| 8,091,590 | B2 * | 1/2012 | Graham | G07F 13/02 |
| | | | | 141/2 |
| 2012/0122495 | A1 * | 5/2012 | Weng | H04W 68/025 |
| | | | | 455/458 |

OTHER PUBLICATIONS

"Nitrofill E-170 Nitrogen Tire Fill Generator & Converter System" from website "http://dallas.craigslist.org/daltld/5349244131.html" last accessed Dec. 28, 2015.

"Phase Separation in Ethanol Blended Gasoline" from website "http://fuelschool.blogspot.com/" last accessed Feb. 2, 2009.

Paul Yanisko, Shiying Zheng, Joe Dumoit, Bill Carlson "Nitrogen: A Security Blanket for the Chemical Industry" From the Nov. 2011 Chemical Engineering Progress 7 pages.

"Reverse Ethanol Phase Separation & Restore Bad Fuel!" from website "http://www.atsenviromental.com/commercial/tank-cleaning/phase-separation/reverse-phase" last accessed on Dec. 3, 2015 2 pages.

* cited by examiner

NITROGEN BLANKETING SYSTEM

TECHNICAL FIELD

The present disclosure relates generally to systems and methods associated with fuel tanks configured for storing fuel, and more particularly to systems and methods associated with preventing corrosion within fuel tanks.

BRIEF DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
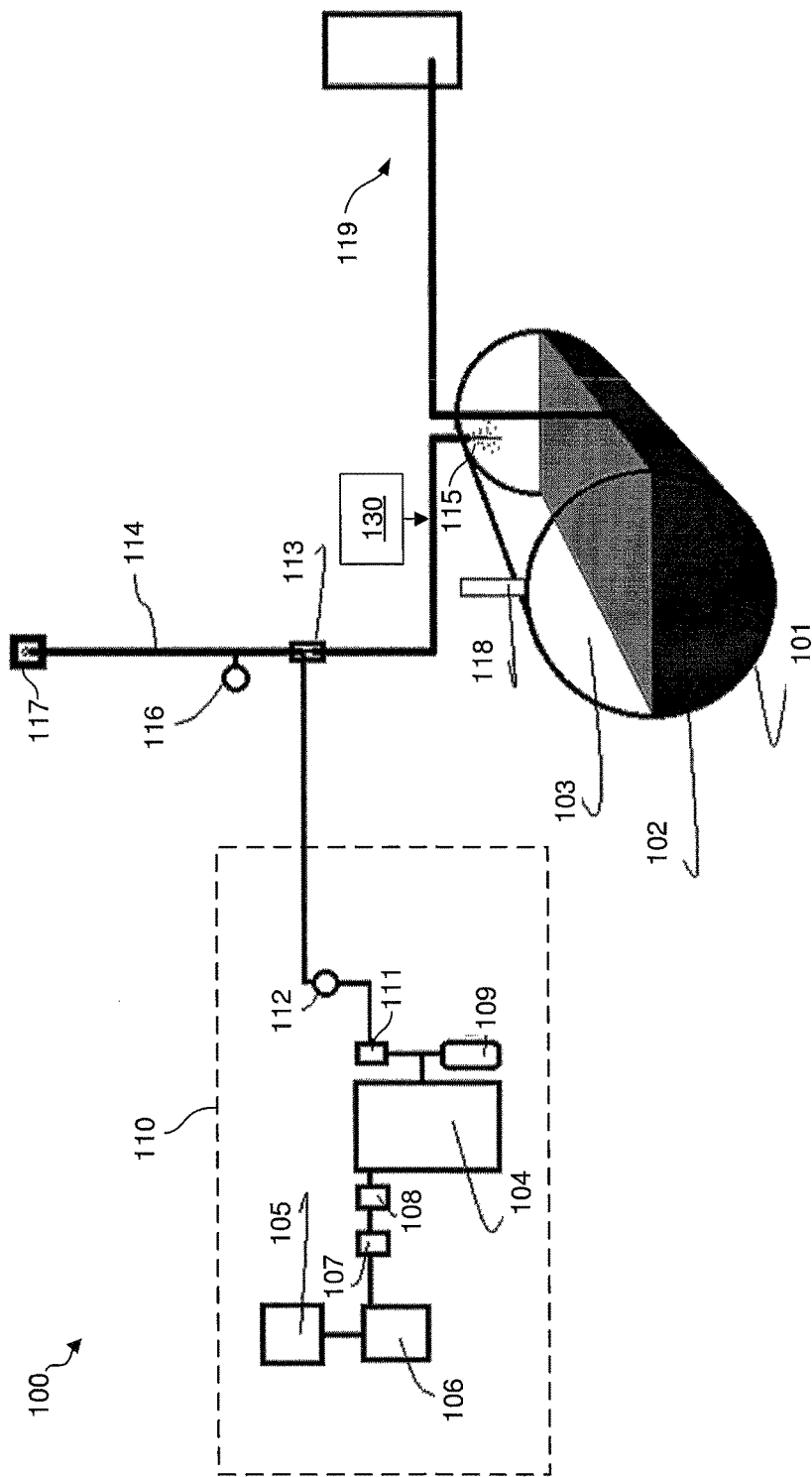
FIG. 1 shows a block diagram of a nitrogen blanket system according to the present application.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIG. 1, a schematic block diagram of a nitrogen blanketing and fuel treatment system 100 is shown. A number of above and below ground Ultra-low-sulfur diesel (ULSD) fuel storage tanks regionally are exhibiting expected signs of a "Debris Cauldron Effect" that potentially presents a condition that (to date) is regionally degrading internal storage tank primary containment boundaries, internal tank components and fittings, product delivery piping, dispenser emergency shear valve internal sealing and seating platforms, dispenser control flow valves, nozzles, hanging hardware components, dispenser filters, and metering devices. This often occurs because, as fuel is pumped out of the fuel tank, it is displaced by air, which introduces moisture into the tank.

Disclosed herein is a nitrogen blanketing system 100 for small fuel tanks that includes tank empty space pressure control for sealed tanks that by design will hold pressure. Small fuel tanks as described herein refer generally to low-pressure fuel tanks no larger than 50,000 gallons and rated for storing fluid at 5 pounds per square inch (psi) or less, including small retail fuel tanks such as those commonly used as underground storage tanks at retail gas stations, which typically have a capacity of no more than about 30,000 gallons. The system 100 includes a fuel tank 101 storing some volume of fuel 102, such as diesel fuel. The remaining empty volume 103 is filled with nitrogen by the disclosed system 100. The nitrogen is provided by a nitrogen generation system 110. The nitrogen generation system 110 includes a nitrogen generator 104 that is driven by a regulated air compressor 105. The regulated air compressor 105 supplies compressed air through a regulated compressed-air reserve tank 106 and via a conduit to an air dryer 107. The air dryer 107 reduces the amount of moisture in the received compressed air, and then supplies the thus-dried air to an air regulator 108 via a conduit, where pressure of the dried air is further regulated. The air from the regulator 108 is then supplied via another conduit to the nitrogen generator 104 where, through a pressure swing absorption method known in the art, the nitrogen generator 104 produces pressurized nitrogen.

The nitrogen from generator 104 flows under pressure via a conduit to a nitrogen reserve buffer tank 109. Nitrogen from the tank 109 and from the generator 104 also flows via conduit 114 to the fuel tank 101. The pressure of the nitrogen from the generator 104 and tank 109 is controlled by a nitrogen pressure regulator 111 and a pressure-sensing switch 112. Nitrogen at the controlled sensed pressure flows from the pressure-sensing switch 112 via a conduit and a coupling 113 into the conduit 114. The nitrogen then flows via the conduit 114 to a nozzle 115, and then into the empty space 103 (also referred to as headspace) of the fuel tank 101, blanketing the fuel 102 that is stored therein. While a single nozzle 115 is shown in FIG. 1, alternative embodiments can include a plurality of nozzles 115. The number of nozzles can be dependent on the size of the tank; for example a tank can have between one and twelve nozzles depending on the size of the tank. A pressure-sensing tank differential switch 116 is in constant communication with the conduit for monitoring pressure in the conduit 114 and the empty space 103 of the tank. The switch 116 is ordinarily closed, thereby blocking the flow of nitrogen. However, if the switch 116 detects excess pressure in the conduit 114, for example if the pressure in the fuel tank exceeds a prescribed amount, then the switch 116 opens to allow nitrogen to vent through a pressure vacuum valve 117. The nitrogen in the empty space 103 is referred to as blanketing nitrogen that blankets the fuel 102 and advantageously reduces or prevents moisture from accumulating in the fuel tank 101.

The pressure-sensing switch 112 and differential switch 116 are both fluidly connected to the headspace 103 of the tank 101 and are configured for maintaining an adequate amount of atmospheric pressure in the headspace 103. Headspace pressure set as low as 1 inch of water column can be sufficient. As the tank 101 discharges fuel 102 and liquid fuel level in the tank 101 drops, the atmospheric pressure in the headspace 103 can sometimes drop below a first threshold amount, causing the switch 112 to open to allow nitrogen from the generator 104 and/or tank 109 to be added to the headspace 103 until the atmospheric pressure in the tank 101 exceeds the first threshold amount, at which point the switch 112 closes to stop the flow of nitrogen from the generator 104 and/or tank 109 to the tank 101. As the tank 101 is filled with the fuel 102, the pressure in the headspace 103 can sometimes increase beyond a second threshold amount, causing the switch 116 to open so that excess nitrogen can exit through the venting valve 117 via the conduit 114 until the atmospheric pressure in the tank 101 drops below the second threshold amount, at which point the switch 116 closes to prevent nitrogen from exiting the tank 101 via the conduit 114 and the venting valve 117.

In some embodiments, the tank 101 can be a small retail fuel tank, e.g., an underground fuel tank at a retail gas station. In such embodiments, the tank 101 can further be in fluid communication with other components commonly associated with such small retail fuel tanks, such as a tank fill riser 118 and a fuel dispenser 119. The fuel riser 118 can be used for venting the fuel tank 101 and/or for adding fuel 102 to the fuel tank 101. The fuel dispenser 119 is used for removing fuel 102 from the tank 101, for example for allowing a consumer to add fuel 102 to a vehicle.

The readily-available supplies of nitrogen, combined with the relatively low cost of inert nitrogen, makes the process of environmental control tank blanketing with inert gas financially advantageous. The desired amount of inert gas volumes can be calculated by the system 100 using known standard formulas.

According to the present disclosure, it is preferable to safely store and connect to a tank of compressed inert gas where it may be in close proximity to fueling customers.

Serviceable storage, dispensing and system component integrity is being effected by a complicated set of constituents and conditions introduced and or existing in ULSD storage tanks. Combinations in some cases are unique and in others a cauldron mix of complicated solution(s) and geometric variables not well understood. While cross contaminated ethanol could be blamed for the bulk of the surfacing concerns, most have concluded that it is somewhat more complicated. Recent industry reports and surveys have described the storage tanks problem environments with (to date) not pointing a resolution(s) path. Also, since the use of alcohols being added to gasoline products became more widespread, there has been a sensitivity to reducing the potential for water to mix with the gasohol as the alcohol will absorb the water as it enters the fuel distribution system. Problems occur when the alcohol content reaches a saturation level at a specific temperature. If the temperature of the fuel drops (typically due to environmental reasons), the alcohol/water mix will separate and drop to the bottom of the tank. This process is referred to as phase separation. This new liquid is more corrosive as the alcohol content is significantly higher. This new liquid also has the alcohol and water to supply the needed nutrients to support microbial growth.

Environmental control blanket nitrogen inerting of ULSD fuel storage tank empty space provides an advantageous way to protect components and prevent, control, or inhibit tank ullage space acetic acid corrosion. Blanket nitrogen inerting prevents ingestion of atmospheric air and moisture in hydrocarbon fuel storage tanks and avoids empty space formation of hydrocarbon vapor and corrosion. As a result, nitrogen blanketing can reduce the amount of hydrocarbons being released into the atmosphere through venting systems of such tanks. Another benefit to inerting the headspace of a fuel storage tank with nitrogen is that it reduces the chance of a flash fire, such as those that regularly occur in fuel tanks due to lightning strikes to the vents or other metallic connections to the headspace of the tank or from static discharge from fueling or filling that be in communication with the head space of a tank, both of these are known and identified problems in the industry.

The disclosed system can be used with various different types of fuel tanks, including diesel fuel tanks at retail gas stations. Other fuel tanks can include tanker trucks, railcars, ocean-going vessels, and ocean platforms. The disclosed system can be used with above-ground fuel tanks and below-ground fuel tanks.

The disclosed system can also be used for pressure-testing a fuel tank. Sensors in the system can be used for monitoring various characteristics of the system and the fuel, such as the blend of the fuel and the amount of moisture in the tank. Sensors can also be associated with the pressure gauge for remote monitoring of the amount of pressure in the fuel tank. The data from the sensors can be transmitted for remote monitoring and can be stored in a database.

The system shown in FIG. 1 is not limited to fixed tanks, but can also be applied to mobile tanks, such as tanks on rail cars, trucks, and ships. Such mobile systems can be configured substantially the same as shown in FIG. 1. Power for mobile systems can include solar power systems and/or vehicular power systems.

In addition, the presence of nitrogen in the conduit 114 also reduces or eliminates the build-up of moisture in the conduit itself, thereby reducing or eliminating corrosion of the conduit 114. It should therefore be appreciated that in some embodiments, the conduit 114 can be a conduit that extends several meters or several kilometers or even longer, and that the system 100 can be modified to prevent corrosion in conduits that provide for the transport of fluids, including liquid petroleum-based products such as fuel or oil, across any distance. For example, the system 100 can be used to provide blanketing nitrogen in a storage tank 101 as well as a conduit that extends between the tank 101 and a distant pumping or drilling station, and that the nitrogen in the conduit will fill the empty space therein to prevent the buildup of moisture therein.

In some embodiments, the system 100 can further include a coating dispenser 130 for injecting a substance for coating the inside of the tank 101, such as a volatile corrosion inhibitor (VCI). For example, one common set of materials used to coat fuel (particularly hydrocarbon based) tanks includes ZERUST product provided by Northern Technologies International Corporation of Circle Pines, Minn. Zerust VCIs are infused into a stable base material—like polyethylene (plastic) sheets. When deployed, VCIs are released from the base/delivery material and a molecular layer of VCI is deposited on the surface of the metal to be protected. Zerust VCIs act in one of the following ways—or a combination of these mechanisms depending on the application: 1. Barrier Film: Where the molecular layer prevents corrosive elements from reaching the metal. In some cases, this may also be in the form of a passivation film. 2. pH Altering: Where the VCI molecules alter the pH of the layer in contact with the metal and prevent corrosion 3. Scavenging: Where the VCI molecules react with the corrosive elements in the environment and convert them into neutral compounds.

VCI products can prevent corrosion in several ways: by acting as a protective barrier from external dirt and abrasion, and also by acting as a barrier to help block the diffusion of corrosive acid gas pollutants from outside the VCI packaging material (such as sulfur dioxide or hydrogen sulfide)—thereby preventing contact of these corrosive gases with enclosed metal surfaces. VCIs can also act as a vapor corrosion inhibitor that passivates the electron flow between the anodic and cathodic areas on metal surfaces and interrupts the electro-chemical corrosion process. VCIs can also add water-repulsion properties to the metal surface, which inhibits water from permeating the metal surface and providing the electrolyte for corrosion reactions.

The vapor corrosion inhibitor portion of VCI products are known that are made of chemical formulations that are invisible, odorless, non-toxic, non-reactive, non-flammable and/or non-allergenic. These chemical formulations can release a corrosion-inhibiting vapor that diffuses throughout an enclosure and settles on exposed metal surfaces to form a microscopic corrosion inhibiting layer. This protective layer will remain on the surface of the metal as long as there is no significant, continuous exchange of air within the enclosure. Ideally, there should be less than one air exchange per day (for example, when an electrical cabinet or package is opened briefly and occasionally). Once the metal part is removed from the enclosure, the corrosion inhibiting layer is no longer kept in place by equilibrium with the VCI source, and it dissipates from metal surfaces (typically within about an hour) leaving the metal part clean, dry and corrosion-free.

Some known VCIs are water-based rust preventative compounds. They can be designed for use as foggable protection for the inside void spaces of tanks, packages and enclosures. They can be suitable for protecting ferrous metals and/or multimetal materials. VCI foggable aqueous-based rust preventative liquids are known that can protect ferrous metals via contact inhibitors. They can also be used as a pressurized spray. VCI molecules migrate to provide protection on even hard to reach areas within an enclosed space. The rust preventative forms a clear, thin, dry-to-touch coating and some known VCIs are safe for use on most painted surfaces, rubber seals, and plastics, and/or can be compatible with other metals such as aluminum, copper, brass, and nickel alloys.

The system 100 advantageously can be used to incorporate VCIs in fuel systems. The system 100 can use the disclosed gas blanketing system to disperse a VCI from dispenser 130 onto surfaces in the fuel tank 101 and other fluidly-connected components, such as conduit 114, vent conduit 118, and fuel dispenser 119. VCI from dispenser 130 can be dispersed along with the inert or blanketing gas into the tank 101 to provide for coating of system surfaces. By integrating with the blanketing system 100, the tank 101 and supply conduits can be provided with a consistent amount of VCI. Alternatively, the VCIs may be introduced as needed at one or more particular time or interval.

The dispenser 130 can include a VCI storage/source tied into a microprocessor-based controller that is configured to dispense VCI material in conjunction with the dispersal of nitrogen into the tank 101 such that the nitrogen can provide for a carrier of VCI (e.g. in fog form) into the tank 101. By utilizing the Vinturi effect, a non-pressurized VCI source can be drawn into the conduit 114 and into the tank 101 and mix properly with the blanketing gas to evenly coat the tank ullage and supply lines.

In the alternative, the VCI can be pressurize and introduced with the blanketing gas, or otherwise introduced alone or sprayed onto tank wall. The introduction and application of VCIs may comprise a separate event to deliver a predetermined level of VCI into the system. VCIs may also be sent as a pressurized spray to coat tank and cause the pressure relief system to open in the tank, and thereby force gases out of the ullage and the relief line. By coating the pressure relief line, it prevents rust on the upper portions of the fuel storage system and prevents rust from breaking off and falling back into the fuel.

VCIs also serve to coat and protect sulfur dioxide from diesel exhaust in a vehicle motor to prevent acid (i.e. sulfuric acid) from eating up vehicle tanks and motor system tubing. VCIs can be used on diesel exhaust fluid and used to line tanks on trucks.

Figure 2:
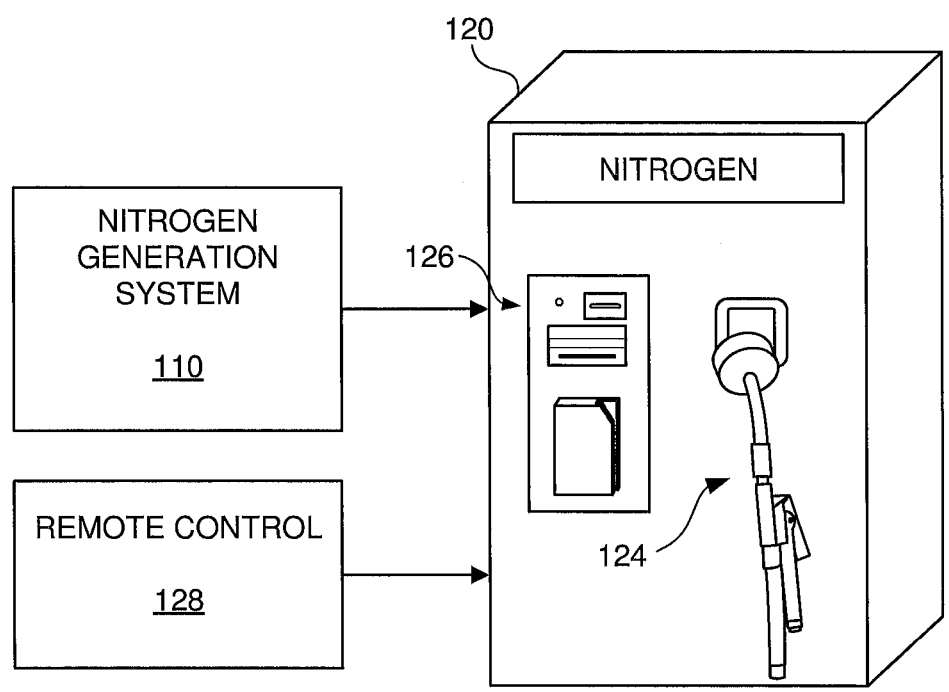
FIG. 2 shows a schematic block diagram of a nitrogen vending station according to the present application.

Referring now also to FIG. 2, in embodiments where the system 100 is used in a retail environment, the nitrogen generation system 110 can be used to provide nitrogen for a nitrogen vending station 120. The nitrogen vending station 120 can be a point-of-sale unit that allows consumers to fill nitrogen-filled automobile tires. The nitrogen vending station 120 can include an air hose 124 configured with a valve and nozzle for allowing a user to inflate standard automobile tires with nitrogen. The nitrogen vending station 120 can also include a payment system for allowing a consumer to make a payment, for example via cash, coins, and/or credit card. In such embodiments, the payment system can be configured to only allow nitrogen to be dispensed via the air hose 124 once payment has been made. Also, the vending station 120 can limit the amount of nitrogen that is dispensed once payment is made, for example based on a predetermined amount of time or based on a predetermined amount of nitrogen. The nitrogen vending station 120 can also include an override control 128 for allowing service station personnel to override the need for a consumer to make a payment and allow the vending station 120 to dispense nitrogen without payment or otherwise allow for free nitrogen from the vending station 120. Alternatively, the nitrogen vending station 120 can be a self-contained or stand-alone system that includes a dedicated nitrogen generation system 110 that only provides nitrogen for the nitrogen vending station 120.

The nitrogen generation system 110 can be used in additional applications where the moisture-reducing benefits of displacing air with nitrogen is beneficial. For example, the nitrogen generation system 110 can be used in connection with networks of electrical conduit to force air out of the conduit and replace the air with nitrogen in order to reduce the amount of moisture in the conduit lines. Alternative examples include the use of the nitrogen generation system 110 for forcing nitrogen into the headspace of plumbing tanks and traps, HVAC systems, septic systems, and grease traps. The use of nitrogen to replace air in such systems can advantageously reduce moisture buildup and microbial growth in such systems.

Also, the nitrogen generation system 110 can be used in connection with emergency systems where it may be advantageous to reduce the oxygen level in the event of a fire emergency. For example, the nitrogen generation system 110 can be configured in communication with an emergency detection system, such as an alarm system or the like, and can be configured to force nitrogen into a room, container, airbag, or any desired space in response to a trigger signal from the emergency detection system.

Over time, some fuels that contain ethanol tend to absorb water. Sources of the absorbed water can include the introduction of liquid water or humidity in the headspace of a vessel, such as an above- or below-ground fuel storage tank, shipping vessel, or vehicle fuel tank. This absorption can occur during manufacturing, shipping, and storage of the fuel. This combination of water with the fuel can lead to a phenomenon known as phase separation, where the water and fuel will form separate layers within a tank. Once phase separation occurs, it can lead to several problems. In a vehicle, for example, the engine could fail to start or could operate poorly or inefficiently due to the intake of water or intake of fuel containing water. In storage tanks, the dispensed fuel containing water will combust inefficiently and components of the fuel containment systems can suffer from accelerated corrosion due to the unanticipated water levels in the fuel.

Figure 3:
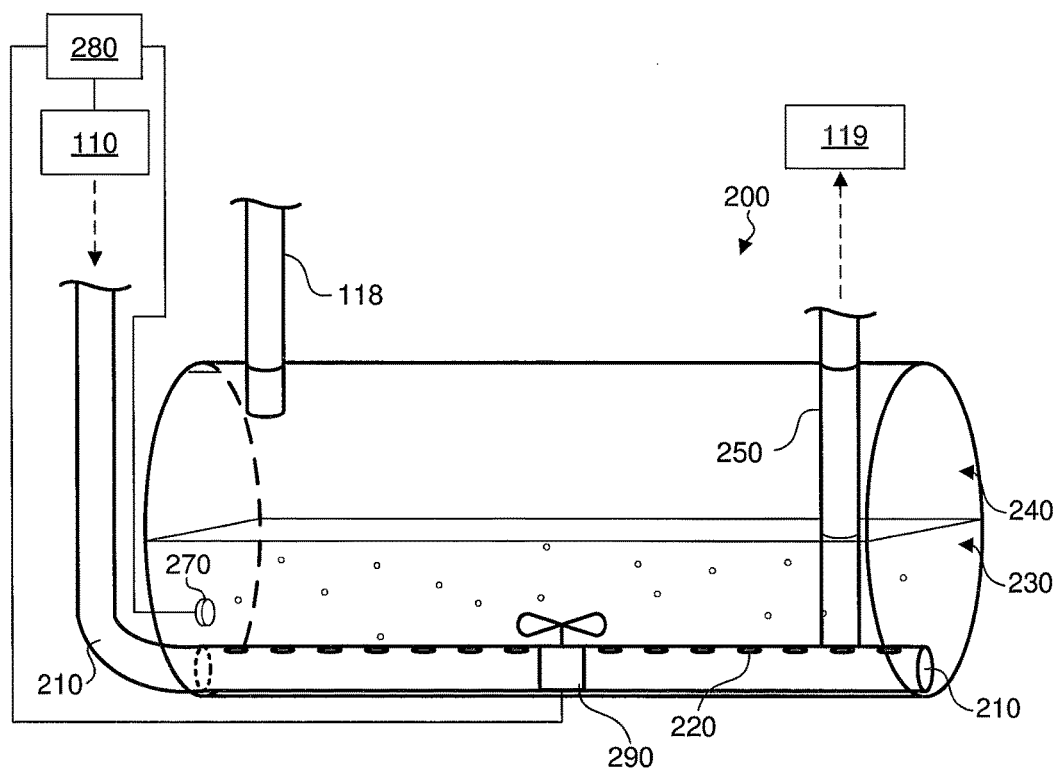
FIG. 3 shows a schematic view of an alternative embodiment of a fuel tank for the system shown in FIG. 1.

The treatment system disclosed herein provides a system and method for treating fuel by introducing nitrogen into the fuel for the purpose of removing water from the fuel. Referring specifically to FIG. 3, an alternative fuel tank 200 is shown that can be used with the system 100 in place of, or in addition to, the fuel tank shown in FIG. 1. The fuel tank 200 is particularly useful for implementation of such a fuel treatment system. The fuel tank 200 includes a conduit 210 that extends along the bottom of the tank 200. The conduit 210 includes one or more apertures 220. The conduit 210 is in fluid communication with the nitrogen generation system 110. More specifically, the conduit 210 can be in fluid communication with the conduit 114 shown in FIG. 1, downstream of the coupling 113 shown in FIG. 1. The conduit 210 receives nitrogen from the nitrogen generation system 110 and dispenses the received nitrogen into the tank 200 from the bottom of the tank 200, through any fuel 230 in the tank 200, to the headspace 240 of the tank 200. The tank 200 can otherwise be the same as the tank shown in FIG. 1, for example including a fuel dispenser conduit 250 to fuel dispenser 119 and tank vent conduit 118.

In some embodiments, the treatment system can include one or more sensors 270 for measuring the amount of water in the fuel. The one or more sensors 270 can provide data to a controller 280, which in turn can control the amount of nitrogen being pumped into the fuel via the nitrogen generation system 110. For example, the controller 280 can be a microprocessor-based device that is configured to control the operation of the nitrogen generation system 110 by activating the nitrogen generation system 110 when data from sensor 270 indicates that water separation operations are needed, and also by controlling the volume and rate at which nitrogen is introduced into the fuel tank 200 depending on whether data from sensor 270 indicates that water separation operations are needed.

The treatment system can also include one or more agitators 290 for agitating the fuel 230 in order to improve the mixing of nitrogen with the fuel 230, and thereby improve the removal of water from the fuel by the nitrogen. The controller 280 can be configured to control the operation of the one or more agitators 290 by activating them when data from sensor 270 indicates that water separation operations are needed, and also by controlling the speed of the agitator(s) 290 in order to adjust the rate at which nitrogen is mixed with the fuel 230 depending on whether data from sensor 270 indicates that water separation operations are needed.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

What is claimed is:

1. A system comprising:
    a nitrogen blanketing system for a fuel tank, the system comprising:
        a nitrogen generator;
        a pressure-sensing switch in fluid communication with the nitrogen generator;
        a conduit for providing a fluid path between the pressure-sensing switch and the fuel tank; and
        a differential switch in fluid communication with the fuel tank via the conduit,
        wherein the pressure-sensing switch is configured to close to prevent nitrogen from flowing from the nitrogen generator to the fuel tank if atmospheric pressure in the fuel tank is above a first predetermined level, and configured to open to allow nitrogen to flow from the nitrogen generator to the fuel tank if atmospheric pressure in the fuel tank is below the first predetermined level, and
        wherein the differential switch is configured to open to allow nitrogen to escape from the fuel tank via the conduit if atmospheric pressure in the fuel tank is above a second predetermined level, and configured to close to prevent nitrogen from escaping from the fuel tank via the conduit if atmospheric pressure in the fuel tank is below the second predetermined level;
    a nitrogen vending station comprising:
        an air hose in fluid communication with the nitrogen generator; and
        a user-operable valve for controlling the flow of nitrogen from the air hose; and
        an override switch to override the payment system and allow nitrogen to flow from the nitrogen generator through the air hose without a payment having first been made via the payment system;
        wherein the nitrogen vending station further comprises a payment system configured to prohibit nitrogen from flowing from the nitrogen generator through the air hose unless a payment has been made via the payment system.

2. The system of claim 1, further comprising a dispenser in fluid communication with the tank via the conduit.

3. The system of claim 2, wherein the dispenser is configured to dispense a volatile corrosion inhibitor into the tank while nitrogen is flowing in the conduit towards the tank.

4. The system of claim 1, further comprising a pressure vacuum valve in fluid communication with the tank via the conduit while the differential switch is open.

5. The system of claim 1, further comprising a buffer tank in fluid communication with the nitrogen generator and the pressure-sensing switch.

\* \* \* \* \*